United States Patent Office 3,168,537 Patented Feb. 2, 1965

3,168,537

PROCESS FOR THE MANUFACTURE OF 16-ALKYLIDENE - 17α - ALKANOYLOXYPROGESTERONES

Eugene P. Oliveto, Glen Ridge, and Elliot L. Shapiro, Cedar Grove, N.J., assignors to Schering Corporation, Bloomfield, N.J., a corporation of New Jersey No Drawing. Filed Aug. 30, 1962, Ser. No. 220,572
5 Claims. (Cl. 260—397.4)

This invention relates to a new and useful group of exocyclic unsaturated pregnanes and to methods for their manufacture. More particularly, this invention relates to a novel method of manufacture of 16-alkylidene-17-lower alkanoyloxyprogesterones and to intermediates produced thereby.

The novel process of this invention is useful in the preparation of progesterones represented by the following formula, including the 19-nor, 1-dehydro, 6-dehydro and 1,6-bis-dehydro analogs thereof.

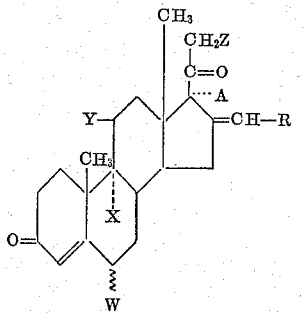

wherein W is a member of the group consisting of hydrogen, methyl, and halogen, preferably chlorine and fluorine; X is a member of the group consisting of hydrogen and halogen; Y is a member of the group consisting of hydrogen, hydroxy, keto, acyloxy and halogen, and when Y is hydrogen, X is hydrogen; A is a member of the group consisting of hydrogen, hydroxy and acyloxy; and R is a member of the group consisting of hydrogen and an alkyl radical having preferably up to four carbon atoms; and Z is a member of the group consisting of hydrogen and halogen, preferably iodine and fluorine.

By the term "acyloxy" is contemplated hydrocarbon carboxylic acid radicals having up to eight carbon atoms, preferably lower alkanoic acids having up to six carbon atoms. These preferred radicals are those obtained from acids such as acetic, propionic, valeric, caproic, t-butylacetic, and the like.

The alkyl radical designated by "R" in the general formula preferably encompasses hydrocarbon radicals such as methyl, ethyl, n-propyl, isopropyl, n-butyl, sec.-butyl, t-butyl although higher homologs such as pentyl and hexyl come within the scope of this invention.

When X and Y are both halogen, there is contemplated halogen pairs such as (Cl, Cl), (Br, Br), (F, F), (Cl, Br), (Cl, F), (F, Cl), (F, Br), (I, Cl), (I, F), (Br, F) and the like.

In this specification, a bond shown as a curved or wavy line (≀) such as is shown at C–6 indicates that both the α and β-configurations are included. A compound name which does not specifically indicate the α or β-configuration implies the inclusion of both isomer forms. Thus, the compound name 6-methyl-16-methyleneprogesterone includes the compounds 6α-methyl-16-methyleneprogesterone and 6β-methyl-16-methyleneprogesterone.

The novel compounds of the general formula as well as the 19-nor, 1-dehydro, 6-dehydro and 1,6-bis-dehydro analogs thereof are active progestational agents. They are thus valuable in the treatment of habitual and threatened abortion, functional dysmenorrhea and premenstrual tension.

The novel, therapeutically active 16-methylene-progesterones of the general formula are further described and claimed in copending application of Oliveto et al., Serial No. 861,208, filed December 22, 1959 of which the present application is a continuation-in-part. The novel compounds of the general formula may be prepared by a number of different routes, the choice of which is dependent on the final product being produced.

By our novel process, the 16-alkylidene-17α-acyloxyprogesterones are prepared from the corresponding 16-alkyl-16,17-oxidprogesterones in a one-step procedure wherein the 16-alkylidene and the 17α-acyloxy groups are simultaneously introduced into the molecule. Thus, our process is advantageously used over other procedures for preparing 16-alkylidene-17α-acyloxyprogesterones from 16-alkyl-16,17-oxidoprogesterones which involve more than one step. According to our process, a 16-alkyl-16,17-oxido-4-pregnene-3-one is treated with a mixture of an acid and an acid anhydride whereby there is formed a 16-alkylidene-17α-acyloxyprogesterone. When the anhydride in the acid-acid anhydride mixture is derived from an acid other than the free acid used in the reagent mixture, the acyl radical of the weaker acid (i.e. the acid possessing the larger $pK_A$ constant) will enter the steroid molecule. Typically, acid-acid anhydride mixtures which are used in our process are exemplified by a lower alkanoic acid and the corresponding acid anhydride, for example, acetic acid and acetic anhydride, an alkanoic acid anhydride such as acetic or caproic anhydride in the presence of a catalytic amount of a strong organic acid (i.e. an acid having a smaller $pK_A$ than that of the acid from which the aforementioned anhydrides are derived) exemplified by p-toluenesulfonic acid, perchloric or trifluoroacetic acid or, alternatively and preferably, a lower alkanoic acid such as acetic or caproic in the presence of a strong organic acid anhydride (trifluoroacetic anhydride for example). Thus by our process, if a 16-alkylidene-17α-acetate derivative is desired there may be used acid-acid anhydride mixtures such as acetic acid and acetic anhydride, acetic anhydride and either p-toluenesulfonic acid or trifluoroacetic acid, or preferably acetic acid and trifluoroacetic anhydride. Specifically, 16β-methyl-16α,17α - oxido-4-pregnene-3,20-dione upon reaction with acetic acid in the presence of trifluoroacetic acid anhydride according to the preferred embodiment of our process is converted to the novel, therapeutically active 16-methylene-17α-acetoxyprogesterone. If caproic acid instead of acetic acid is used with trifluoroacetic anhydride, the aforementioned 16α,17α-oxido-4-prognene is converted to 16-methylene-17α-caprooxyprogesterone.

Our process whereby a 16-alkyl-16,17-oxidoprogesterone is converted to the corresponding 16-alkylidene-17α-alkanoyloxyprogesterone is generally carried out in a solvent under anhydrous conditions and in an inert atmosphere such as argon or nitrogen. Although any inert solvent such as benzene, toluene, xylene and the like may be used, the preferred solvent for our process is the lower alkanoic acid corresponding to the ester desired at C–17. Thus, acetic acid is preferably used when a 17-acetate is desired and caproic acid when a 17-caproate is to be prepared.

The preferred procedure for carrying out our process is to heat a tenth of a mole of a 16-alkyl-16,17-oxidoprogesterone for example in a mixture containing approximately 2 to 7 moles of a lower alkanoic acid and approximately 0.3 to 0.71 mole of trifluoroacetic anhydride, respectively (the lower alkanoic acid serving as solvent as well as reactant) at temperatures ranging from 70 to 100° C. for about 20 minutes to 1.5 hours. In another procedure of choice, a mixture of a tenth of a mole of 16-alkyl-16,17-oxidoprogesterone is allowed to react with approximately 0.14 to 0.7 mole of a lower alkanoic acid anhydride in the presence of from about 0.02 to 0.06 mole, respectively of p-toluenesulfonic acid in the presence of from about 2 to 6 moles of solvent (preferably a lower alkanoic acid) for approximately 30 minutes to 4 hours at temperatures in the range of 15 to 30° C.

The above represent preferred modes of carrying out our inventive process and are not to be construed as limiting. However, when a lower alkanoic anhydride is the reagent used in our process, for example, when reacting acetic anhydride and p-toluenesulfonic acid with 16β-methyl-16α,17α-oxidoprogesterone, and the reaction conditions are not within the preferred limits, i.e. if the molar quantities of the reagents are greater, or if a longer reaction time or high temperature is used, there will be formed in addition to the desired 16-alkylidene-17α-acyloxyprogesterone, the enol-3,17-diester form of this compound, e.g. 3β,17α-diacetoxy-16-methylene-3,5-pregnadiene-20-one as well as 16-methylene-17α-acetoxyprogesterone. The greater the deviatio from the previously described optimum conditions the greater the amount of enol-diester formed. The 16-alkylideneprogesterones of our invention may be regenerated from the enol-3,17-diester-3,5-pregnadienes thus formed by known techniques utilizing reagents such as methanolic hydrochloric acid or sodium acetate in acetic acid.

Progesterones only have been described as starting compounds in our process. However, any steroid molecule possessing a 16-alkyl-16,17-oxido function, may be converted by our novel process to the corresponding 16-alkylidene-17-acyloxy steroid. Thus, 9α-fluoro-16β-methyl-16α,17α-oxido-4-pregnene-11β,21-diol-3,20-dione 21 - acetate (prepared from 9α-fluorohydrocortisone 21-acetate by procedures described in the copending application of Oliveto et al., Serial No. 861,211, filed December 22, 1959) when reacted with acetic acid and trifluoroacetic anhydride according to our novel process will yield 9α-fluoro-16-methyleneprednisolone 11,17,21-triacetate.

Alternatively, the 16-alkylidene-17α-acyloxyprogesterones of the general formula are prepared from the corresponding 16-alkyl-16,17-oxido-4-pregnene-3,20-dione in a two-step process whereby the oxido group is first converted to the 16-alkylidene-17α-hydroxy function by treatment with a mineral acid such as sulfuric, hydrochloric, or preferably hydrobromic in a lower alkanoic acid such as acetic. Thus, 16β-methyl-16α,17α-oxido-4-pregnene-3,20-dione when treated with acetic acid in the presence of hydrobromic acid yields 16-methylene-17α-hydroxyprogesterone. Esterification of the hydroxyl function at the 17-carbon in 16-methylene-17α-hydroxyprogesterone is then conveniently effected with a lower fatty acid anhydride such as acetic anhydride in the presence of p-toluenesulfonic acid or, preferably, with a lower aliphatic acid such as acetic acid in the presence of trifluoroacetic anhydride to give the corresponding 17-ester, which in this case is 16-methylene-17α-acetoxyprogesterone. By substituting other lower alkanoic acids such as caproic or β-cyclopentylpropionic for acetic in the aforementioned esterification procedures, other 17α-lower alkanoate 16-alkylidene compounds are obtained such as the 17-caproate and the 17α-(β-cyclopentyl)-propionate respectively of 16-methylene-17α-hydroxyprogesterone.

The 16-alkyl-16,17-oxido-5-pregnene-3β-ols, necessary intermediates in our novel process for preparing the 17α-acyloxy-16-alkylideneprogesterones of the general formula, are conveniently prepared from the corrsponding 16-alkyl-5,16-pregnadiene-3β-ol-20-ones upon treatment with alkaline hydrogen peroxide. Some of these 5,16-pregnadiene starting compounds are known, for example 16-methyl-5,16-pregnadiene-3β-ol-20-one. Other 16-alkyl-5,16-pregnadienes may be conveniently prepared from the known 5,16-pregnadiene-3β-ol-20-one 3-acetate by reaction with a suitable alkyl magnesium halide such as, for example, ethyl magnesium iodide in the presence of a copper salt to yield the corresponding 16-alkyl-5-pregnene, e.g. 16α-ethyl-5-pregnene-3β-ol-20-one. Esterification of the 3-hydroxyl is effected by acetic anhydride in pyridine yielding 16α-ethyl-5-pregnene-3β-ol-20-one 3-acetate. Bromination at C-17 (with concomitant addition of bromine at $C_5$ and $C_6$ followed by sodium iodide treatment to regenerate the double bond) by means of bromine in acetic acid followed by dehydrobromination of the thus formed 16α-ethyl-17α-bromo-5-pregnene-3β-ol-20-one 3-acetate with a basic agent such as collidine, dimethylformamide, lutidine or the like yields the requisite 16-alkyl-$\Delta^{5,16}$-intermediate, 16-ethyl-5,16-pregnadiene-3β-ol-20-one 3-acetate.

By a suitable choice of Grignard reagent when preparing the necessary 16-alkyl-16,17-oxido intermediates of our process any desired 16-alkyl compound may be obtained. Thus, reaction of 5,16-pregnadiene-3β-ol-20-one with n-butyl magnesium bromide and subsequent acetylation yields 16α-n-butyl-5-pregnene-3β-ol-20-one 3-acetate. Bromination and dehydrobromination of the 16α-n-butyl-5-pregnene compounds as described above gives 16-n-butyl-5,16-pregnadiene-3β-ol-20-one 3-acetate which, when epoxidized with alkaline hydrogen peroxide yields a necessary intermediate of our process, e.g. 16β-n-butyl-16α,17α-oxido-5-pregnene-3β-ol-20-one. Oxidation of the 3-hydroxy-$\Delta^5$-pregnene according to the Oppenauer techniques employing aluminum isopropoxide affords the corresponding progesterone (3-keto-$\Delta^4$) which when reacted according to our novel process with caproic anhydride in the presence of p-toluenesulfonic acid, for example, yields the novel 17α-acyloxyprogesterone, 16-butylidene-17α-caprooxyprogesterone, whereas treatment with hydrogen bromide in acetic acid would yield a 17-hydroxy compound i.e. 16-butylidene-17α-hydroxyprogesterone.

Alternatively, a 16-alkyl-$\Delta^{16}$-intermediate (precursor of the necessary 16-alkyl-16,17-oxidoprogesterone intermediates) exemplified by 6,16-dimethyl-5,16-pregnadiene-3β-ol-20-one 3-acetate, is prepared from the known 6-methyl-5,16-pregnadiene-3β-ol-20-one 3-acetate by reaction with diazomethane yielding 6-methyl-16,17-pyrazolino-5-pregnene-3β-ol-20-one 3-acetate which is pyrolyzed at temperatures in the range of 200° C. to form the aforementioned 6,16-dimethyl-5,16-pregnadiene-3β-ol-20-one 3-acetate.

Iodine may be introduced in the 21-position by procedures which utilize iodine in the presence of an alkaline substance such as sodium hydroxide or calcium oxide. Thus 16β-methyl-16α,17α-oxidoprogesterone is converted to 21-iodo-16β-methyl-16α,17α-oxidoprogesterone which is then conveniently converted to a 17α-acyloxyprogesterone by reaction with an acid-acid anhydride mixture according to our process, e.g. reaction with acetic acid and trifluoroacetic acid anhydride will yield 21-iodo-16-methylene-17α-acetoxyprogesterone.

The 21-fluoro-progesterones are obtained from the corresponding 21-iodo analogs by the action of silver fluoride in moist acetonitrile. For example, 21-fluoro-16β-methyl-16α,17α-oxido-progesterone is derived from 21-iodo-16β-methyl-16α,17α-oxidoprogesterone, and subsequently reacted with acetic and trifluoroacetic anhydride according to our process to give 21-fluoro-16-methylene-17α-acetoxyprogesterone.

A 6-substituent is introduced into a 16-alkylideneprogesterone to form the novel 6-substituted-16-alkylideneprogesterones by employing known chemical techniques. Esterification of the 3-hydroxy group in a pregnenolone compound such as 16β-methyl-16α,17α-oxido-5-pregnene-3β-ol-20-one with, for example, acetic anhydride in pyridine, yields the corresponding 3-acyloxy ester, i.e. 16β-methyl-16α,17α-oxido-5-pregnene-3β-ol- 20-one 3-acetate. When the thus prepared 3-acetoxy ester is treated with acetic acid and hydrobromic acid for example, there is formed the corresponding 16-methylene-3β,17α-dihydroxy-5-pregnene-20-one 3-acetate. Treatment of the latter compound with ethylene glycol by known procedures yields the 20-ethylene ketal derivative which, in turn, is epoxidized on treatment with a peracid such as peracetic or, preferably, monoperphthalic acid to give the epoxy derivative, 3β,17α-dihydroxy-5α,6α-epoxy-16-methylenepregnane-20-one 3-acetate 20-ethylene ketal. The 6-methyl substituent is introduced into the pregnane nucleus by the addition to this epoxy derivative of a Grignard reagent such as methyl magnesium iodide which, with subsequent hydrolysis, yield a 5α-hydroxy-6-methyl intermediate, e.g. 3β,5α,17α - trihydroxy - 6β-methyl-16-methylenepregnane-20-one 20-ethylene ketal. Chromic acid oxidation converts the 3β-hydroxypregnane to the corresponding 3 - ketopregnane, 5α,17α - dihydroxy - 6β-methyl - 16 - methylenepregnane - 3,20-dione 20-ethylene ketal. A reagent such as ethanolic hydrochloric acid used on the aforementioned 3-ketopregnane simultaneously dehydrates the 5α-hydroxy group, epimerizes the 6β-substituent, and regenerates the 20-ketone to yield, for example, 6α-methyl-16-methylene-17α-hydroxyprogesterone. In order to obtain a 6β-configuration, a 5α-hydroxy-6β-substituted pregnane intermediate (e.g. 5α,17α-dihydroxy - 6β-methyl-16-methylenepregnane-3,20-dione 20-ethylene ketal) is treated with, for example, thionyl chloride in a cold basic medium such as pyridine or in approximately 90% acetic acid to give 16-alkylideneprogesterones such as 6β-methyl-16-methylene-17α-hydroxyprogesterone 20-ethylene ketal or 6β-methyl-17α-hydroxy-16-methyleneprogesterone, respectively. A 6α-alkyl-16-alkylideneprogesterone may also be prepared from the corresponding 6β-substituted progesterone by means of alcoholic solutions of acids or bases such as ethanolic hydrogen chloride and ethanolic potassium hydroxide.

When preparing a 6-alkyl-16-alkylidene-17α-acyloxyprogesterone by our process the 6-substituent is introduced into a 16-alkyl-16α,17α-oxido starting compound which is then reacted with an acid-acid anhydride mixture according to our process to give the corresponding 17α-acyloxyprogesterone. Thus, 6α,16β- dimethyl-16α,17α-oxidoprogesterone (prepared as shown in Example 6) when reacted with acetic anhydride and trifluoroacetic acid yields 6α-methyl-16-methylene-17α-acetoxyprogesterone.

A method of introducing a 6-chloro group into the molecule utilizes as starting compounds the 16-methyleneprogesterones of the general formula and reagents such as N-bromosuccinimide or N-chlorosuccinimide as the halogen donor. By this method 16-methylene-17α-acetoxy-21-fluoroprogesterone, for example, is converted to the corresponding 3-enol-ether-3,5-diene by means of ethyl-o-formate in the presence of an acid catalyst such as sulfuric acid. The 3-ethoxy-16-methylene-17α-acetoxy-21-fluoro-3,5-pregnadiene-20-one thus prepared when reacted with N-chlorosuccinimide, for example, in the presence of a solvent such as pyridine, with or without the aid of a catalyst such as p-toluenesulfuric acid, yields the 6β - epimer, 6β-chloro-16-methylene-17α-acetoxy-21-fluoroprogesterone. The corresponding 6α-chloro-16-methylene-17α-acetoxy-21-fluoroprogesterone is obtained from the aforementioned 6β-chloro compound by treatment with alcoholic hydrogen chloride. When N-bromosuccinimide is used in the foregoing procedure instead of N-chlorosuccinimide, the corresponding 6-bromo compound of our invention is formed, i.e. 6β-bromo-16-methylene-17α-acetoxy-21-fluoroprogesterone.

A method of introducing a 6-fluoro group into the molecule employs perchloryl fluoride as the halogenating agent and as starting compounds either a 3-enol-ether- 3, 5-diene exemplified by the above described 3-ethoxy-16-methylene -17α-acetoxy-21-fluoro-3,5-pregnadiene-20-one, or a 3-enol-ester-3,5-diene such as 3,17-diacetoxy-16-methylene-3,5-pregnadiene-20-one. The latter intermediate is prepared from the corresponding 16-alkyl-16,17-oxidoprogesterone with an excess of acetic anhydride in the presence of p-toluenesulfonic acid according to a heretofore mentioned procedure. Specifically, 3,17-diacetoxy-16-methylene-3,5-pregnadiene-20-one reacted with perchloryl fluoride in a solvent such as pyridine yields 6β-fluoro-16-methylene-17α-acetoxyprogesterone. The corresponding 6α-fluoro-16-methylene-17α-acetoxyprogesterone is obtained from the 6β-fluoro epimer by treatment with alcoholic hydrogen chloride.

Novel progesterones of the general formula possessing a hydrogen at C–17 are conveniently prepared by reacting a 16 - alkylidene - 17α-acyloxyprogesterone of the general formula with an alkaline or an alkaline earth metal such as lithium or calcium in a basic medium such as liquid ammonia or diethylamine, or by the action of zinc in aqueous ethanol. In the former procedure it is preferable that the 3-keto group be protected with a ketal derivative such as the ethylene ketal. For example, 16-ethylidene-17α-acetoxyprogesterone upon treatment with ethylene glycol is converted to the corresponding 3-ethylene ketal derivative (i.e. 3 - ethylenedioxy - 16 - ethylidene-17α-acetoxy-5-pregnene-20-one) which when reacted with lithium in liquid ammonia gives 3 - ethylenedioxy - 16-ethylidene-5-pregnene-20-one. Hydrolysis with a mild acid such as aqueous acetic acid regenerates the 3-ketone group to give 16-ethylideneprogesterone.

The novel 9α,11β-dihalogeno - 16 - alkylideneprogesterones depicted by the general formula are prepared as described in copending application of Oliveto et al., Serial No. 861,208, filed December 22, 1959, by reacting a suitable halogenating agent with a 16-alkylidene-4,9(11)-pregnadiene - 3,20 - dione or a 16-alkylidene-1,4,9(11)-pregnatriene-3,20-dione or with a 6, 17, or 21 - monosubstituted, or a (6, 17), (6, 21), or (17, 21)-disubstituted, or a 6, 17, 21-trisubstituted-16-alkylidene-4,9(11)-pregnadiene-3,20-dione.

In preparing the 9,11-dihalogeno derivatives of the general formula, it is sometimes convenient to introduce the 9,11-bond prior to the 16-alkylidene group and then simultaneously introduce the 16-alkylidene and 17α-acyloxy group by our novel process. For example, when one has an 11-hydroxy compound intermdiate available such as 3β,11α-dihydroxy,5-16,pregnadiene-20-one, selective esterification of the 3-hydroxyl group by means of pyridine and acetic anhydride yields 3β-acetoxy-11α-hydroxy-5,16-pregnadiene-20-one which is then esterified at C–11 with p-toluenesulfonyl chloride as described above. The resulting 11α-p-toluenesulfonate ester is dehydrated by means of sodium acetate and acetic acid to yield the 9,11 - dehydro intermediate: 5,9(11),16 - pregnatriene-3β-ol-20-one 3 - acetate. A 16 - alkyl group is then introduced according to the previously described procedures such as that utilizing diazomethane followed by pyrolysis of the intermediary 16,17-pyrazolino compound to yield 16-methyl-5,9(11),16-pregnatriene - 3β-ol-20-one 3-acetate. The 16,17-epoxide is conveniently obtained from the latter compound by hydrogen peroxide in alkali. The resultant 16-alkyl-16,17-epoxy intermediate, e.g. 16β - methyl - 16α,17α - oxido - 5,9(11) - pregnadiene - 3β - ol - 3,20 - one is converted to the corresponding progesterone ($\Delta^4$ - 3-keto) via an Oppenauer oxidation to give 16β-methyl-16α,17α-oxido-9(11)-dehydroprogesterone. Treatment of this 16-alkyl-16,17-oxido intermediate with acetic acid and trifluoroacetic acid anhydride according to our novel process yields the corresponding 16 - methylene - 17α - acetoxy-9(11)-dehydroprogesterone.

In preparing 9,11-dihalogeno compounds which contain 17α-acyloxy groups it is also possible to introduce the $\Delta^{9,11}$-bond into a 16 - methylene - 17α - hydroxyprogesterone and then esterify the 17-hydroxyl group either before or after introducing halogen at the 9 and 11-positions. For example, 9α,11β-dichloro-16-methylene-17α-acetoxyprogesterone may be prepared by two routes. In one, 16-methylene-17α-acetoxy - 9(11) - dehydroprogesterone is prepared by our process as described in the preceding paragraph or, alternatively, 16-methylene-17α-hydroxy - 9(11) - dehydroprogesterone is converted by known techniques to the aforementioned 17-acetate ester which is then chlorinated at C–9 and C–11 with, for example, lithium chloride, hydrogen chloride and N-chlorosuccinimide. Alternatively, 16 - methylene-17a-hydroxy-9(11)-dehydroprogesterone is chlorinated with chlorine and pyridine in carbon tetrachloride; for example, to give the novel 9α,11β-dichloro - 16 - methylene-17α-hydroxyprogesterone. Esterification with acetic acid and trifluoroacetic anhydride yields the desired 9α,11β-dichloro-16-metylene-17α-acetoxyprogesterone.

In general, the 9α,11β-dihalogeno compounds of the general formula are prepared from the above-mentioned 9,(11) - dehydroprogesterone intermediates by utilizing halogenating reagents under reaction conditions described in U.S. Patent No. 2,894,963 and in the copending applications of Robinson and Gould et al., Serial Nos. 817,079 and 817,048, both filed June 1, 1959, now U.S. Patents Nos. 3,009,933 and 3,049,554, respectively.

The 9α - halogeno - 11 - oxygenated-16-alkylideneprogesterones are also conveniently prepared from the 16-alkylidene - 9(11) - dehydroprogesterone intermediates described heretofore. For example, 6α-methyl-16-methylene-17α-acetoxy-4,9(11)-pregnadiene - 3,20- dione when reacted with N-bromoacetamide in aqueous dioxane in the presence of perchloric acid according to known techniques yields the novel 6α-methyl-9α-bromo - 11β,17α-dihydroxy-16-methyleneprogesterone 17-acetate.

Other 9α-halogeno-11β-hydroxyprogesterone, i.e. the 9α-iodo, chloro and fluoro are obtainable from the corresponding 9β,11β - oxido - 16 - alkylideneprogesterones which, in turn, are derived from the 9α-bromo-11β-hydroxy - 16 - alkylideneprogesterones by treatment with potassium acetate in ethanol or acetone. Addition of hydrogen chloride in chloroform or of hydrogen fluoride in chloroform-tetrahydrofuran, or of hydroiodic acid in acetic acid to a 9β,11β-oxido-progesterone yields the corresponding 9α-chloro-11β-hydroxy, 9α-fluoro-11β-hydroxy, or 9α-iodo-11β-hydroxy, respectively. Thus, 6α-methyl - 9α - bromo -11β,17α - dihydroxy-16-methyleneprogesterone 17-acetate is converted to 6α-methyl-9β,11β - oxido-16-methylene - 17α - hydroxyprogesterone 17-acetate. Addition of hydrogen fluoride to the oxide yields 6α-methyl - 9α - fluoro - 11β - hydroxy-16-methylene-17α-acetoxyprogesterone of our invention. By using hydrogen chloride or hydroiodic acid instead of hydrogen fluoride with the aforementioned oxidoprogesterone, there is obtained 6α-methyl - 9α - chloro - 11β-hydroxy-16-methylene-17α-acetoxyprogesterone and 6α-methyl-9α-iodo - 11β - hydroxy - 16 - methylene - 17α-acetoxyprogesterone.

To obtain the 11-keto compounds of the general formula the above 9,11-halohydrins such as 9α-fluoro-11β - hydroxy-17α-acetoxy - 16 - methyleneprogesterone may be oxidized with, for example, chromic acid to give as a representative example 9α - fluoro - 11 - keto-16-methylene-17α-acetoxyprogesterone.

In preparing the 1-dehydro analogs of the previously described 16-alkylideneprogesterones, 11-oxygenated-16-alkylideneprogesterones and the 9α,11β-dihalogeno-16-alkylideneprogesterones of the general formula, the $\Delta^1$-bond may be introduced at various stages during the synthesis of the compound and preferably in the later stages. Thus, a 16-alkylidene-1-dehydroprogesterone such as 6α-chloro - 16 - methylene - 17α - acetoxy - 1,4 - pregnadiene-3,20-dione and 6α-methyl-9α-fluoro-11β,17α-dihydroxy-16-methyleneprogesterone 17-acetate is prepared from the corresponding 16-alkylideneprogesterones, e.g. 16-methylene - 17α - hydroxyprogesterone, 6α-chloro-16-methylene-17α-acetoxyprogesterone and 6α-methyl-9α-fluoro-11β,17α-dihydroxy-16-methyleneprogesterone 17-acetate by microbiological dehydrogenation with an organism such as *Corynebacterium simplex* (A.T.C.C. 6946) in a manner similar to that described in U.S. Patent No. 2,837,464 or by chemical dehydrogenation through the use of a reagent such as selenium dioxide. Alternatively, the $\Delta^1$ analog of the 16β-methyl-16α,17α-oxidoprogesterone may be prepared, e.g. 16β-methyl-16α,17α-oxidoprogesterone is converted to the corresponding $\Delta^1$-analog by the action of *Corynebacterium simplex* and the resulting 16β-methyl-16α,17α-oxido-1,4-pregnadiene-3,20-dione upon reaction with acetic acid and trifluoro acetic anhydride according to our process yields a $\Delta^1$-compound of the general formula, i.e. 16-methylene-17α-acetoxy-1,4-pregnadiene-3,20-dione.

The 6-dehydro analogs of the 16-alkylideneprogesterones described above are obtained by subjecting the corresponding progesterone to the oxidizing action of chloranil. The novel 6α-methyl-16-methylene-17α-acetoxyprogesterone is transformed by means of chloranil to the 6-dehydro analog, 6-methyl-16-methylene-17α-acetoxy-6-dehydroprogesterone (6 - methyl - 16 - methylene - 17α-hydroxy-4,6-pregnadiene-3,20-dione 17-acetate).

The 16-alkylidene-1,6-bis-dehydroprogesterones of our invention are preferably prepared from the corresponding novel 16-alkylidene-6-dehydroprogesterones by known procedures utilizing selenium dioxide. For example, 6-chloro - 16 - methylene - 17α - hydroxy - 4,6 - pregnadiene-3,20-dione 17-acetate (prepared by the reaction of chloranil on 6α-chloro-16-methylene-17α-acetoxyprogesterone) reacted with selenium dioxide and mercury in t-butyl alcohol and acetic acid yields 6-chloro-16-methylene-17α-hydroxy-1,4,6-pregnatriene-3,20-dione 17-acetate (6 - chloro - 16 - methylene - 17α - hydroxy - 1,6 - bis-dehydroprogesterone 17-acetate).

The following examples are illustrative of the procedures employed in preparing the compounds of this invention but are not to be construed as limiting the scope thereof, the scope of our invention being limited only by the appended claims.

EXAMPLE 1.—16β-METHYL-16α,17α-OXIDO-PROGESTERONE (A) *16β-methyl-16α,17α-oxido-5-pregnene-3β-ol-20-one*

To a solution of 32 ml. of 50% aqueous sodium hydroxide in 125 ml. of water is added a solution of 164 g. of 16-methyl-5,16-pregnadiene-3β-ol-20-one in 500 ml. of chloroform and 1200 ml. of methanol. The mixture is cooled to below 25° C. and then there is added with stirring 225 ml. of 35% hydrogen peroxide. Stirring is continued for 48 hours and the mixture is acidified with acetic acid. A saturated solution of sodium sulfite is added until any excess peroxide is destroyed as determined by the iodide-starch test. The mixture is then steam distilled and the residue filtered. The solid is recrystallized from acetone to give 16β-methyl-16α,17α-oxido-5-pregnene-3β-ol-20-one, M.P. 188° C. $[\alpha]_D^{25}$ —20° (1% in dioxane).

(B) *16β-methyl-16α,17α-oxidoprogesterone*

25 grams of 16β-methyl-16α,17α-oxido-5-pregnene-3β-ol-20-one are dissolved in 1725 ml. of toluene. About 175 ml. of toluene is distilled, then 375 ml. of freshly distilled cyclohexanone is added to the solution, followed by the dropwise addition over a five minute period of a solution of 12.5 g. of aluminum isopropoxide in dry toluene. The solution is refluxed for one hour under a Dean-Stark trap. 60 ml. of water is added cautiously and then the water is azeotroped off. The solution is cooled, filtered and the filtrate steam distilled. The suspension left after steam distillation is filtered. The solid residue is washed with water, dried and crystallized from isopropyl ether to give 16β-methyl-16α,17α-oxidoprogesterone, λ ETOH 240 mμ (ε 16,760); M.P. 160–163° C.; $[\alpha]_D$ +118.0 (dioxane).

EXAMPLE 2.—16-METHYLENE-17α-HYDROXY-PROGESTERONE 17-ACETATE 8.8 grams of 16β-methyl-16α,17α-oxidoprogesterone are dissolved in 88 ml. of acetic acid. Argon gas is gently bubbled through the solution to displace the air, then 17.5 ml. of trifluoroacetic anhydride is added. The resulting dark brown solution is warmed at 80–95° C. for about one hour under anhydrous conditions. The reaction mixture is then diluted with water and extracted with methylene chloride. The extracts are combined, washed with 3% aqueous sodium carbonate, then with water and is evaporated to a residue which is crystallized from acetone-ether to give 16-methylene-17α-hydroxyprogesterone 17-acetate; M.P. 227–227.5° C.; λ ETOH 240 mμ (ε 17,300); $[\alpha]_D$ −51.8 (dioxane).

EXAMPLE 3.—16-METHYLENE-17α-HYDROXY-PROGESTERONE 17-CAPROATE

A solution of 1 g. of 16β-methyl-16α,17α-oxidoprogesterone is dissolved in 10 ml. of N-caproic acid and 2 ml. of trifluoroacetic anhydride. Argon gas is gently bubbled through the solution at a temperature of 80–95° C. for 55 minutes. Water is added to the reaction mixture which is then extracted with methylene chloride. The organic extracts are combined and, in turn, are extracted with 3% aqueous sodium hydroxide and finally with water. The methylene chloride phase is evaporated to a residue which is dissolved in hexane and chromatographed over Florisil. Eluates of 5% ether in 95% hexane through 35% ether in 65% hexane are combined and evaporated to a residue which is crystallized from ether-hexane to give 16-methylene-17α-hydroxyprogesterone 17-caproate, M.P. 124.5–127° C.;

$\lambda_{max.}^{ETOH}$ 239 mμ (ε 17,300); $[\alpha]_D$ −44.9 (dioxane)

EXAMPLE 4.—16-METHYLENE-17α-HYDROXY-1-4-PREGNADIENE-3,20-DIONE 17-ACETATE (A) *16-methyl-16,17-oxide-1,4-pregnadiene-3,20-dione*

A solution of 1 g. of yeast extract (Difco) in 1 liter of tap water, the pH of which is adjusted to 6.9, is distributed among ten 300 ml. Erlenmeyer flasks and to each flask is added a loopful, 2 ml. of *Corynebacterium simplex* (A.T.C.C. 6946). The resulting suspensions are incubated at 30° C. on a shaking machine for 18 hours. One-half gram of 16β-methyl-16α,17α-oxido-progesterone is dissolved in 20 ml. of acetone and the resulting solution is distributed equally among the ten flasks containing the 18 hours growth of *Corynebacterium simplex*. The culture containing the progesterone is then incubated at 30° C. for 24 hours. At the end of 24 hours, the contents of the flasks are combined and extracted with a total of 3 liters of chloroform. The crude chloroform extract from the transformation is then concentrated to a residue which is crystallized from acetone-hexane to give 16β-methyl-16α,17α-oxido-1,4-pregnadiene-3,20-dione.

(B) *16-methylene-17α-hydroxy-1,4-pregnadiene-3,20-dione 17-acetate*

16β-methyl-16α,17α-oxido-1,4-pregnadiene-3,20-dione is reacted with acetic acid and trifluoroacetic anyhdride in a manner similar to that described in Example 2 and there is obtained 16-methylene-17α-hydroxide,1,4-pregnadiene-3,20-dione 17-acetate.

EXAMPLE 5.—16-METHYLENE-17α-HYDROXY-21-FLUOROPROGESTERONE 17-ACETATE (A) *16β-methyl-16α,17α-oxido-21-iodoprogesterone*

16β-methyl-16α,17α-oxidoprogesterone (0.5 g.) is dissolved in 5.6 ml. of tetrahydrofuran and 3.4 ml. methanol. Calcium oxide (finely ground) (0.75 g.) and 0.75 g. of iodine are then added. The initial deep brown color slowly changes to pale yellow over a 35 minute period. After an additional hour the reaction solution is diluted with methylene chloride, filtered and then the filtrate is washed successively with a solution of 3% sodium iodide, then 4% sodium thiosulfate and with water. The organic solution is evaporated to a tan amorphous solid, which upon crystallization from acetone-hexane affords 16β-methyl-16α,17α-oxido-21-iodoprogesterone.

(B) *16β-methyl-16α,17α-oxido-21-fluoroprogesterone*

To 0.5 g. of 16β-methyl-16α,17α-oxido-21-iodoprogesterone dissolved in 100 ml. of acetonitrile containing 1 ml. of water there is added a 50% aqueous solution of 1.5 g. of silver fluoride. The mixture is warmed at 30–40° C. for 4 hours, then filtered. The filtrate is poured into water. The resulting solid is filtered and crystallized from acetone-hexane to give 16β-methyl-16α,17α-oxido-21-fluoroprogesterone.

(C) *16-methylene-17α-hydroxy-21-fluoroprogesterone 17α-acetate*

In a manner similar to that described in Example 2, 16β-methyl-16α,17α-oxido-21-fluoroprogesterone is esterified by means of acetic acid and trifluoroacetic anhydride to give 16-methylene-17α-hydroxy-21-fluoroprogesterone 17 acetate.

In a similar manner, by substituting other lower alkanoic acids such as caproic acid and propionic acid for acetic acid in the procedure described in Example 5(C) there is obtained the corresponding 17-caproate and 17-propionate esters, i.e. 16-methylene-17α-hydroxy-21-fluoroprogesterone 17-caproate and 16-methylene-17α-hydroxy-21-fluoroprogesterone 17-propionate, respectively.

EXAMPLE 6.—6α-METHYL-16-METHYLENE-17α-HYDROXYPROGESTERONE 17-ACETATE (A) *6-methyl-16,17-pyrazolino-5-pregnene-3β-ol-20-one 3-acetate*

A solution of 3.5 g. of 6-methyl-5,16-pregnadiene-3β-ol-20-one 3-acetate in 5 ml. of methylene chloride is added to a solution of approximately 1 g. of diazomethane in 65 ml. of ether which had been cooled to approximately −10° C. The mixture is kept at 0° C. for 5 hours, then allowed to warm up to room temperature. The excess diazomethane is displaced with a nitrogen stream and the reaction solution is evaporated to a residue which is crystallized from acetone-ether to give 6-methyl-16,17-pyrazolino-5-pregnene-3β-ol-20-one 3 acetate.

(B) *6,16-dimethyl-5,16-pregnadiene-3β-ol-20-one 3-acetate*

The 16,17-pyrazolino prepared in Example 6(A) is heated under reduced pressure at approximately 10 mm. vacuum until liquifaction occurs. The temperature and pressure is maintained until the evolution of nitrogen has ceased. The residual oil is then cooled to room temperature and crystallized from ether to give 6,16-dimethyl-5,16-pregnadiene-3β-ol-20-one 3-acetate.

(C) *6,16β-dimethyl-16α,17α-oxido-5-pregnene-3β-ol-20-one*

To a solution of 1.5 g. of 6,16-dimethyl-5,16-pregnadiene-3β-ol-20-one 3-acetate in 95 ml. of methanol at approximately 15° C. is added 3 ml. of 4 N sodium hydroxide followed by 6 ml. of 30% hydrogen peroxide solution. The mixture is allowed to remain at approximately 5° C. for 18 hours. The reaction solution is poured into 500 ml. of water and the resulting precipitate is filtered, dried and crystallized from acetone-hexane to give 6,16β-dimethyl-16α,17α-oxido-5-pregnene-3β-ol-20-one.

(D) *6α,16β-dimethyl-16α-17α-oxidoprogesterone*

6,16β-dimethyl-16α,17α-oxido-5-pregnene-3β-ol-20-one (0.5 g.) is dissolved in 35 ml. of toluene. After collecting by distillation approximately 4 ml. of toluene, 7.5 ml. of freshly distilled cyclohexanone is added, followed by the dropwise addition of a solution of 0.25 g. of aluminum isopropoxide in dry toluene. The solution is refluxed for 1 hour under a Dean-Stark trap, then 1.2 ml. of water is added cautiously, and then the water azeotroped off. The solution is cooled, filtered and the toluene and cyclohexanone are removed by steam distillation. The resulting solid is filtered, washed with water, dried and crystallized from isopropyl ether to give 6α,16β-dimethyl-16α,17α-oxidoprogesterone.

(E) *6α-methyl-16-methylene-17α-hydroxyprogesterone 17-acetate*

6α,16β-dimethyl-16α,17α-oxidoprogesterone is reacted with acetic acid and trifluoroacetic anhydride according to the procedure of Example 2 to give 6α-methyl-16-methylene-17α-hydroxyprogesterone 17-acetate.

EXAMPLE 7.—6-METHYL-16-METHYLENE-17α-HYDROXY-4,6-PREGNADIENE-3,20-DIONE 17-ACETATE

Two grams of 6α-methyl-16-methylene-17α-hydroxyprogesterone 17-acetate and 5 g. of chloranil in 60 ml. of ethyl acetate and 15 ml. of acetic acid are heated at reflux temperature for 13 hours under an atmosphere of nitrogen. The reaction mixture is evaporated to a residue and extracted with ethyl acetate. The organic extracts are combined with cold 7% aqueous sodium hydroxide, then with water, dried over magnesium sulfate, filtered and evaporated to a residue which is crystallized from acetone-hexane to give 6-methyl-16-methylene-17α-hydroxy-4,6-pregnadiene-3,20-dione 17-acetate.

EXAMPLE 8.—6α-CHLORO-16-METHYLENE-17α-HYDROXYPROGESTERONE 17-ACETATE (A) *3-ethoxy-16-methylene-17α-hydroxy-3,5-pregnadiene-20-one 17-acetate*

A solution containing 0.32 g. of 16-methylene-17α-acetoxyprogesterone (the compound of Example 2), 0.342 ml. of ethyl-o-formate, 0.091 ml. of concentrated sulfuric acid, 0.0173 ml. of anhydrous ethanol and 3.73 ml. of dioxane is left at room temperature for 15 minutes. Pyridine (0.73 ml.) is added and the solution evaporated to a residue to which 5 ml. of methanol are added. A precipitate separates which is filtered and dried to give 3-ethoxy-16-methylene-17α-hydroxy-3,5-pregnadiene-20-one 17-acetate which is used without further purification in the following procedure.

(B) *6β-chloro-16-methylene-17α-hydroxyprogesterone 17-acetate*

0.5 gram of the 3-ethoxypregnadiene of Example 8(A) and 0.2 g. of N-chlorosuccinimide are dissolved in 3.5 ml. of pyridine and 5 ml. of water are heated on the steam bath for one hour. The reaction solution is cooled, poured into water and acidified with hydrochloric acid. The aqueous mixture is extracted with methylene chloride. The organic extracts are combined, washed with water, dried over magnesium sulfate, filtered and evaporated to a residue of 6β-chloro-16-methylene-17α-hydroxyprogesterone 17-acetate which is used without further purification in the following procedure.

(C) *6α-chloro-16-methylene-17α-hydroxyprogesterone 17-acetate*

6β-chloro-16-methylene-17α-hydroxyprogesterone 17-acetate (150 mg.) is dissolved in 30 ml. of chloroform and the solution is cooled to −10° C. A stream of anhydrous hydrogen chloride is bubbled through the solution during a period of 2 hours while maintaining the temperature at −10° C. The chloroform solution is washed with sodium bicarbonate solution and water, then dried and evaporated to a residue. Crystallization from acetone-hexane gives 6α-chloro-16-methylene-17α-hydroxy-progesterone 17-acetate.

EXAMPLE 9.—3β-HYDROXY-5,9(11),16-PREGNATRIENE-20-ONE 3-ACETATE (A) *3β,11α-dihydroxy-5,16-pregnadiene-20-one 3-acetate*

To a solution of 1.1 g. of 3β,11α-dihydroxy-5,16-pregnadiene-20-one in 10 ml. of dry pyridine is added 0.33 g. of acetic anhydride and the reaction mixture is allowed to remain at room temperature for 3 hours. Water is added and a precipitate results which is filtered, dried, and then crystallized from methanol to give 3β,11α-dihydroxy-5,16-pregnadiene-20-one 3-acetate.

(B) *3β,11α-dihydroxy-5,16-pregnadiene-20-one 3-acetate 11-p-toluenesulfonate*

A solution of 2.5 g. of 3β,11α-dihydroxy-5,16-pregnadiene-20-one 3-acetate in 10 ml. of chloroform and 14 ml. of dry pyridine is chilled in an ice-bath, then 2.5 g. of p-toluenesulfonyl chloride is added in small portions. The reaction mixture is stirred in the cold for 80 minutes, then allowed to warm to and remain at room temperature for 18 hours. The reaction mixture is then poured into ice-water, stirred and extracted with chloroform. The organic extracts are combined, washed with water, dried over magnesium sulfate, filtered and concentrated in vacuo to a residue which is crystallized from methanol to give 3β,11α-dihydroxy-5,16-pregnadiene-20-one 3-acetate 11-p-toluenesulfonate.

(C) *3β-hydroxy-5,9(11),16-pregnatriene-20-one 3-acetate*

To a solution of 1.9 g. of anhydrous sodium acetate in 20 ml. of acetic acid, at about 105° C., is added 1.25 g. of 3β,11α-dihydroxy-5,16-pregnadiene-20-one 3-acetate 11-p-toluene-sulfonate. The solution is refluxed for 40 minutes, then chilled in ice, and diluted with cold water. The resultant precipitate is filtered, washed with water, dried and crystallized from acetone-hexane to give 3β-hydroxy-5,9(11),16-pregnatriene-20-one 3-acetate.

EXAMPLE 10.—3β-17α-DIHYDROXY-16-METHYLENE-5,9(11)-PREGNADIENE-20-ONE (A) *3β-hydroxy-16,17-pyrazolino-5,9(11)-pregnadiene-20-one 3-acetate*

In the manner of Example 6(A), 3β-hydroxy-5,9(11),16-pregnatriene-20-one 3-acetate is reacted with diazomethane. The resultant product is isolated in the described manner and crystallized from acetone-hexane to give 3β-hydroxy-16,17-pyrazolino-5,9(11)-pregnadiene-20-one 3-acetate.

(B) *3β-hydroxy-16-methyl-5,9(11),16-pregnatriene-20-one 3-acetate*

The 16,17-pyrazolino-5,9(11)-pregnadiene of Example 10(A) is heated under reduced pressure in the manner of Example 6(B). The resultant product is isolated in the described manner and crystallized from ethyl ether to give 3β-hydroxy-16-methyl-5,9(11),16-pregnatriene-20-one 3-acetate.

(C) *3β-hydroxy-16β-methyl-16α,17α-oxido-5,9(11)-pregnadiene-20-one*

3β-hydroxy-16-methyl-5,9(11),16-pregnatriene-20-one 3-acetate is reacted with alkaline hydrogen peroxide in the manner of Example 6(C) and the resultant product isolated in the described manner and crystallized from acetone-hexane to give 3β-hydroxy-16β-methyl-16α,17α-oxido-5,9(11)-pregnadiene-20-one.

(D) *16β-methyl-16α,17α-oxido-4,9(11)-pregnadiene-3,20-dione*

3β-hydroxy-16β-methyl-16α,17α-oxido-5,9(11) - pregnadiene-20-one is reacted with aluminum isopropoxide and cyclohexanone in toluene in the manner of Example 1(B). The resultant product is isolated as described and crystallized from ether to give 16β-methyl-16α,17α-oxido-4,9(11)-pregnadiene-3,20-dione.

EXAMPLE 11.—16-METHYLENE-17α-HYDROXY-4,9(11)-PREGNADIENE-3,20-DIONE 17-ACETATE

The 16α,17α-oxido-4,9(11)-pregnadiene of Example 10(D) is reacted with acetic acid and trifluoroacetic anhydride in the manner of Example 2. The resultant product is isolated in the described manner and crystallized from acetone-hexane to give 16-methylene-17α-hydroxy-4,9(11)-pregnadiene-3,20-dione 17-acetate.

EXAMPLE 12.—9α,11β - DICHOLO - 16 - METHYLENE - 17α - HYDROXYPROGESTERONE 17 - ACETATE (A) To a solution of 1.0 g. of 17α-hydroxy-16-methene-4,9(11)-pregnadiene-3,20-dione 17-acetate and 4.0 g. of lithium chloride in 50 ml. of glacial acetic acid cooled to 10° C. is added 250 mg. of hydrogen chloride in 10 ml. of tetrahydrofuran followed by 0.5 g. of 93% N-chlorosuccinimide. The solution is stirred in the dark at room temperature for 20 minutes and then is poured into ice-water with stirring. A yellow precipitate separates, which is filtered, washed with water, triturated with ether and crystallized with acetone-hexane to give 9α,11β-dichloro-16-methylene-17α - hydroxyprogresterone 17-acetate.

(B) Alternatively, the compound of this example is prepared as follows. To 1.0 g. of the 17α-hydroxy-16-methylene-4,9(11)-pregnadiene-3,20-dione 17-acetate dissolved in 35 ml. of carbon tetrachloride at 20° C., is added 2.1 ml. chlorine gas in carbon tetrachloride (111 mg. $Cl_2$/ml.) and 0.75 ml. of pyridine. The mixture is stirred at −20° C. for 20 minutes, then allowed to warm to room temperature over 40 minutes. The solution is filtered and the filtrate concentrated in vacuo to a residue which is triturated with ether. A solid results which is crystallized from acetone-hexane to give 9α,11β-dichloro-16-methylene-17α-hydroxyprogesterone 17-acetate.

EXAMPLE 13.—9α-BROMO-11β-FLUORO-16-METHYLENE-17α-HYDROXYPROGESTERONE 17-ACETATE

To a solution of 1 g. of 16-methylene-17α-hydroxy-4,9(11)-pregnadiene-3,20-dione 17-acetate and 0.5 g. of N-bromoacetamide in 50 ml. of diethylacetic acid, there is added a solution of 0.5 g. of hydrogen fluoride in 4.7 ml. of a chloroform-tetrahydrofuran mixture (1:2). The solution is stirred at room temperature for 2 hours, then poured into ice water with stirring. The acid is neutralized by the addition of sodium bicarbonate and a precipitate forms from which the aqueous solution is decanted. The precipitate is dried and then dissolved in acetone-ether and filtered through a column of Florisil in ether. The column is then eluted with ether. The combined ether eluates are evaporated to a residue which is crystallized from ethylene chloride-hexane to give 9α-bromo-11β-fluoro-16-methylene-17α-hydroxyprogesterone 17-acetate.

EXAMPLE 14.—6α-METHYL-9α-BROMO-11β,17α-DIHYDROXY - 16 - METHYLENEPROGESTERONE 17-ACETATE

To a mixture of 0.2 g. of 6α-methyl-16-methylene-17α-hydroxy-4,9(11)-pregnadiene-3,20-dione 17-acetate (prepared as described in the copending application of Oliveto et al., Serial No. 861,208, filed December 22, 1959) in 20 ml. of dioxane which has been purified by refluxing over sodium followed by distillation and 2 ml. of water is added 0.07 g. of N-bromoacetamide and 1 ml. of 1.5 N perchloric acid. The mixture is allowed to stand for 2 hours, then a solution of 0.2 g. of sodium sulfite in 2 ml. of water is added and the mixture is extracted with methylene chloride. The organic extracts are combined, washed with water, dried over magnesium sulfate and evaporated to a residue which is crystallized from acetone to give 6α-methyl-9α-11β,17α-dihydroxy - 16 - methyleneprogesterone 17-acetate.

EXAMPLE 15.—6α-METHYL-9α-FLUORO-11β,17α-DIHYDROXY - 16 - METHYLENEPROGESTERONE 17-ACETATE (A) *6α-methyl-9β,11β-oxido-16-methylene-17α hydroxyprogesterone 17-acetate*

To 0.3 g. of 6α-methyl-9α-bromo-11β,17α-dihydroxy-16-methyleneprogesterone 17-acetate (prepared as described in copending application of Oliveto et al., Serial No. 861,208, filed December 22, 1959) in 30 ml. of acetone is added 0.3 g. of potassium acetate. The reaction mixture is refluxed for 6 hours, then the acetone is distilled. Water is added to the resultant residue. A solid separates which is filtered and crystallized from methanol-water to give 6α-methyl-9β,11β-oxide-16-methylene-17α-hydroxyprogesterone 17-acetate.

(B) *6α-methyl-9α-fluoro-11β,17α-dihydroxy-16-methyleneprogesterone 17-acetate*

To 3.5 g. of hydrogen fluoride in 20 ml. of chloroform and 0.6 ml. of tetrahydrofuran at −10° C. is added 2 g. of 6α-methyl-9β,11β-oxido-17α-hydroxy-16-methyleneprogesterone 17-acetate. The reaction mixture is kept at −10° C. for 3 hours, then poured into aqueous sodium carbonate solution. The organic solvent layer is separated from the water and evaporated to a residue which is crystallized from methanol to give 6α-methyl-9α-fluoro-11β,17α-dihydroxy-16-methyleneprogesterone 17-acetate.

EXAMPLE 16.—6α-METHYL-9α-FLUORO-11 - KETO-16 - METHYLENE - 17α - HYDROXYPROGESTERONE 17-ACETATE

To 0.3 g. of 6α-methyl-9α-fluoro-11β,17α-dihydroxy-16-methyleneprogesterone 17-acetate in 15 ml. of acetic acid is added a solution of 60 mg. of chromium trioxide in 1 ml. of water and 3 ml. of acetic acid. The mixture is allowed to stand at room temperature for 6 hours, then water is added and the mixture is extracted with methylene chloride. The organic extracts are combined, washed with water, dried over magnesium sulfate, filtered and evaporated to a residue which is crystallized from methanol to give 6α-methyl-9α-fluoro-11-keto-16-methylene-17α-hydroxyprogesterone 17-acetate.

EXAMPLE 17.—16 - BUTYLIDENE - 17α-HYDROXYPROGESTERONE 17-ACETATE (A) *16α-n-butyl-5-pregnene-3β-ol-20-one 3-acetate*

3.6 grams of 5,16-pregnadiene-3β-ol-20-one 3-acetate in 20 ml. of dry toluene is added to a Grignard reagent prepared from 10.5 g. of butyl ioide and 1.8 g. of magnesium in 40 ml. of ether, and containing 200 mg. of cupric chloride. The reaction mixture is distilled until a vapor temperature of 100° C. is reached. The distillation is then stopped, and the reaction temperature maintained at 100° C. for 5 hours. The mixture is cooled, poured into ice and an aqueous solution of ammonium chloride, and the solvent layers separated. The organic layer is distilled in vacuo to a residue which is chromatographed on Florisil. Eluates ranging from 15% ether-in-hexane to 35% ether-in-hexane are collected and evaporated. The resultant residue is dissolved in 20 ml. of dry pyridine and 3 ml. of acetic anhydride and allowed to stand at room temperature for 5 hours. Water is added. A precipitate results which is filtered and crystallized from acetone-hexane to give 16α-n-butyl-5-pregnene-3β-ol-20-one 3-acetate.

(B) *16α-n-butyl-17α-bromo-5-pregnene-3β-ol-20-one 3-acetate*

One gram of the 16α-n-butyl-5-pregnene of Example 17(A) is dissolved in 10 ml. of acetic acid and there is added 2:1 equivalents of bromine in acetic acid. When the bromine color is discharged, 0.5 g. of sodium iodide in 3 ml. water is added. The solution is warmed at 30° C. for 20 minutes, cooled and then diluted with water. A precipitate results which is filtered, washed with water, dried and crystallized from aqueous acetone to give 16α-n-butyl-17α-bromo-5-pregnene-3β-ol-20-one 3-acetate.

(C) *16-n-butyl-5,16-pregnadiene-3β-ol-20-one 3-acetate*

One gram of the 16α-n-butyl-17α-bromo-5-pregnene of Example 17(B) is refluxed in 20 ml. of dimethylformamide under a nitrogen atmosphere for 3 hours. The reaction mixture is cooled, then poured into ice-water containing excess hydrochloric acid, and extracted with methylene chloride. The extracts are combined, washed with water, dried over magnesium sulfate and evaporated to a residue which is chromatographed over Florisil. Eluates ranging from 10% ether-in-hexane to 30% ether-in-hexane are combined and evaporated to a residue which is crystallized from methylene chloride-hexane to give 16-n-butyl-5,16-pregnadiene-3β-ol-20-one 3-acetate.

(D) *16β-n-butyl-16α,17α-oxido-5-pregnene-3β-ol-20-one*

In a manner similar to that described in Example 10(D), the 16-n-butyl-5,16-pregnadiene of Example 6(A) is reacted with hydrogen peroxide in an alkaline solution. The resultant product is isolated and purified as described to give 16β-n-butyl-16α,17α-oxido-5-pregnene-3β-ol-20-one.

(E) *16β-n-butyl-16α,17α-oxidoprogesterone*

In a manner similar to that described in Example 1(B), 16β-n-butyl-16α,17α-oxido-5-pregnene-3β-ol-20-one is reacted with aluminum isopropoxide in the presence of cyclohexanone to give 16β-n-butyl-16α,17α-oxidoprogesterone.

(F) *16-butylidene-17α-hydroxyprogesterone 17-acetate*

In the manner of Example 2, the 16α,17α-oxidoprogesterone of Example 17(E) is reacted with acetic acid and trifluoroacetic anhydride to give 16-butylidene-17α-hydroxyprogesterone 17-acetate.

EXAMPLE 18.—16-ETHYLIDENE-17α-HYDROXY-4,9(11)-PREGNADIENE-3,20-DIONE 17-ACETATE (A) *16α-ethyl-5,9(11)-pregnadiene-3β-ol-20-one 3-acetate*

In a manner similar to that described in Example 17(A) 5,9(11),16-pregnatriene-3β-ol-20-one 3-acetate (the compound of Example 9) is reacted with ethyl magnesium iodide and subsequently esterified to give 16α-ethyl-5,9(11)-pregnadiene-3β-ol-20-one 3-acetate.

(B) *16α-ethyl-17α-bromo-5,9(11)-pregnadiene-3β-ol-20-one 3-acetate*

In the manner of Example 17(B) the 16α-ethyl-5,9(11)-pregnadiene of Example 18(A) is reacted with 3:1 equivalents of bromine in acetic acid and the resultant product treated with 1 g. of sodium iodide and purified to give 16α-ethyl-17α-bromo-5,9(11)-pregnadiene-3β-ol-20-one 3-acetate.

(C) *16-ethyl-5,9(11),16-pregnatriene-3β-ol-20-one 3-acetate*

In the manner of Example 17(C) the 16α-ethyl-17α-bromo-5,9(11)-pregnadiene of Example 18(B) is reacted with dimethyl formamide to give 16-ethyl-5,9(11),16-pregnatriene-3β-ol-20-one 3-acetate.

(D) *16β-ethyl-16α,17α-oxido-5,9(11)-pregnadiene-3β-ol-20-one*

The 16-ethyl-5,9(11),16-pregnatriene of Example 18(C) is reacted with alkaline hydrogen peroxide in the manner of Example 6(C) to give 16β-ethyl-16α,17α-oxido-5,9(11)-pregnadiene-3β-ol-20-one.

(E) *16β-ethyl-16α,17α-oxido-4,9(11)-pregnadiene-3,20-dione*

In a manner similar to that described in Example 1(B), 16β-ethyl-16α,17α-oxido-5,9(11)-pregnadiene-3β-ol-20-one is reacted with aluminum isopropoxide in the presence of cyclohexanone to give 16β-ethyl-16α,17α-oxido-4,9(11)-pregnadiene-3,20-dione.

(F) *16-ethylidene-17α-hydroxy-4,9(11)-pregnadiene-3,20-dione 17-acetate*

The 16α,17α-oxido-4,9(11)-pregnadiene of Example 18(E) is reacted with acetic acid and trifluoroacetic anhydride in the manner of Example 2 to give 16-ethylidene-17α-hydroxy-4,9(11)-pregnadiene-3,20-dione 17-acetate.

EXAMPLE 19.—9α,11β-DICHLORO-16-ETHYLIDENE-17α-HYDROXYPROGESTERONE 17-ACETATE 16-ethylidene-17α-hydroxy-4,9(11)-pregnadiene-3,20-dione 17-acetate is reacted with N-chlorosuccinimide, hydrogen chloride and lithium chloride in the manner described in Example 12. The resultant product is isolated and purified in the described manner to give 9α,11β-dichloro-16-ethylidene-17α-hydroxyprogesterone 17-acetate.

EXAMPLE 20.—ALTERNATE PROCEDURES FOR THE PREPARATION OF 16-METHYLENE-17α-ACETOXYPROGESTERONE (A) One gram of 16β-methyl-16α,17α-oxidoprogesterone is dissolved in a mixture of 5 ml. of acetic acid, 1.5 ml. of acetic anhydride, and 0.15 g. of p-toluene-sulfonic acid. The solution is stirred at room temperature for three hours, then diluted with water. A solid results which is filtered and dried to give 16-methylene-17α-acetoxyprogesterone.

Alternatively, the compound of this example is prepared according to procedures B and C.

(B) *3,17α-diacetoxy-16-methylene-3,5-pregnadiene-20-one*

To one gram of 16β-methyl-16α,17α-oxidoprogesterone is added a mixture of 10 ml. of acetic anhydride, 1 ml. of acetic acid and 0.5 g. of p-toluenesulfonic acid. The reaction mixture is stirred at room temperature for 48 hours. Water is added and the resultant mixture is stirred for three hours. The mixture is filtered and the resultant residue is crystallized from ether-hexane to give 3,17α-diacetoxy-16-methylene-3,5-pregnadiene-20-one.

Alternatively, if one gram of 16-methylene-17α-hydroxy-progesterone (prepared as described in copending application of Oliveto et al., Serial No. 861,208, filed December 22, 1959) is reacted with acetic anhydride and p-toluenesulfonic acid exactly as described in the procedure of this example there is obtained 3,17α-diacetoxy-16-methylene-3,5-pregnadiene-20-one.

(C) *16-methylene-17α-acetoxyprogesterone*

One gram of 3,17α-diacetoxy-17-methylene-3,5-pregnadiene-20-one is dissolved in 50 ml. of 95% ethanol and there is added 0.5 ml. of concentrated hydrochloric acid. The solution is left at room temperature for 30 minutes, then evaporated under a stream of air to one-third the original volume. Water is added and the resultant solid is filtered and air-dried to give 16-methylene-17α-acetoxyprogesterone.

We claim:

1. In the process of preparing a 16-alkylidene-17α-lower alkanoyloxypregnane, the step which comprises reacting a 16-alkyl-16,17-oxidopregnane with an acid-acid anhydride mixture of the group consisting of an anhydride of a lower alkanoic acid having up to 8 carbon atoms with a strong organic acid and a lower alkanoic acid having up to 8 carbon atoms with an anhydride of a strong organic acid wherein the $pK_A$ of said strong acid is at most equal to the $pK_A$ of said lower alkanoic acid.

2. In the process of preparing compounds of the group consisting of 16-alkylidene-4-pregnenes, the 1-dehydro, 6-dehydro, and the 1,6-bis-dehydro analogs thereof, said 16-alkylidene-4-pregnenes having the following formula:

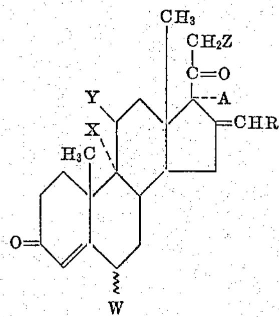

wherein W is a member of the group consisting of H, methyl, and halogen; X is a member of the group consisting of hydrogen and halogen; Y is a member of the group consisting of hydrogen, halogen, keto, hydroxy, and lower alkanoyloxy and when Y is hydrogen, X is hydrogen; Z is a member of the group consisting of hydrogen and halogen; A is lower alkanoyloxy having up to 8 carbon atoms; and R is a member of the group consisting of hydrogen and lower alkyl; the step which comprises reacting a compound of the group consisting of 16,17-oxido-4-pregnenes, the 1-dehydro, 6-dehydro, and 1,6-bis-dehydro analogs thereof, said 16,17-oxido-4-pregnenes having the following formula:

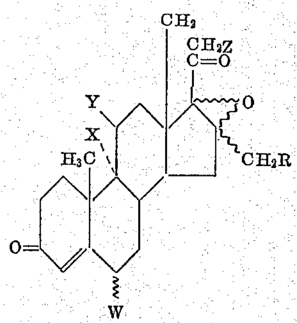

wherein W, X, Y, Z and R are as above defined, with an acid-acid anhydride mixture of the group consisting of an anhydride of a lower alkanoic acid having up to 8 carbon atoms with a strong organic acid and a lower alkanoic acid having up to 8 carbon atoms with an anhydride of a strong organic acid wherein the $pK_A$ of said strong organic acid is at most equal to the $pK_A$ of said lower alkanoic acid.

3. The process according to claim 2 wherein the acid-acid anhydride mixture is acetic acid and trifluoroacetic anhydride.

4. The process according to claim 2 wherein the acid-acid anhydride mixture is propionic acid and trifluoroacetic anhydride.

5. In the process of preparing 17α-acetoxy-16-methyleneprogesterone, the step which comprises reacting 16β-methyl-16α,17α-oxidoprogesterone with acetic acid and trifluoroacetic anhydride.

References Cited in the file of this patent

UNITED STATES PATENTS 2,954,386 Beyler ---------------- Sept. 27, 1960